United States Patent [19]
Sutterlin

[11] Patent Number: 5,485,040
[45] Date of Patent: Jan. 16, 1996

[54] POWERLINE COUPLING NETWORK

[75] Inventor: Philip H. Sutterlin, San Jose, Calif.

[73] Assignee: Echelon Corporation, Palo Alto, Calif.

[21] Appl. No.: 178,455

[22] Filed: Jan. 6, 1994

Related U.S. Application Data

[63] Continuation of Ser. No. 698,618, May 10, 1991, abandoned.

[51] Int. Cl.⁶ ..................................... H04B 3/56
[52] U.S. Cl. ..................... 307/3; 307/104; 340/310.07
[58] Field of Search .................. 307/3, 103, 104; 340/310 R, 310 A, 310.07, 310.08; 333/32

[56] References Cited

U.S. PATENT DOCUMENTS

| | | | |
|---|---|---|---|
| 3,846,638 | 11/1974 | Wetherell | 307/3 |
| 4,473,817 | 9/1984 | Perkins | 307/3 X |
| 4,517,548 | 5/1985 | Ise et al. | 340/310 R |
| 4,538,136 | 8/1985 | Drabing | 340/310 R |
| 4,697,166 | 9/1987 | Warnagiris et al. | 340/310 R |
| 4,862,157 | 8/1989 | Noel | 340/825 |
| 4,885,563 | 12/1989 | Johnson et al. | 340/310 A |
| 5,005,187 | 4/1991 | Thompson | 375/94 |

*Primary Examiner*—A. D. Pellinen
*Assistant Examiner*—Fritz M. Fleming
*Attorney, Agent, or Firm*—Blakely, Sokoloff, Taylor & Zafman

[57] ABSTRACT

An apparatus for reducing power line communication signal attenuation is disclosed. This apparatus provides for reduction of power line communication signal attenuation by balancing reactance between chosen circuit elements and the typical impedances found in a house, structure, or similar entity. The present invention uses a series resonant circuitry to couple the communication signal to the power line. The inductance in the series resonant circuitry is chosen to compensate for the de-tuning effect of the typical power line to which it's coupled in the communication system.

31 Claims, 3 Drawing Sheets

FIG. 1

FIG_2 (PRIOR ART)

FIG_3 (PRIOR ART)

FIG_4 (PRIOR ART)

FIG_5 (PRIOR ART)

FIG_6 (PRIOR ART TUNED CIRCUIT)

FIG_7

FIG_8

POWERLINE COUPLING NETWORK

This is a continuation of application Ser. No. 07/698,618, filed May 10, 1991 now abandoned.

FIELD OF THE INVENTION

The present invention relates to the field of power line communications wherein communication signals are transmitted over signal lines normally used for power transmission. More specifically, the present invention relates to the field of reducing power line communication signal attenuation caused by the various elements and devices which comprise and connect to power lines within a plane, boat, house (or other structure), etc.

BACKGROUND OF THE INVENTION

It has become common in the computing industry to transfer data and commands between data processing devices such as computers, printers, displays, terminals, etc., commonly referred to as "nodes" or network resources. Interconnection of computers and other devices has been achieved via a variety of different networks. One such network is known as a Local Area Network (LAN).

It is predicted that LAN's will be used for many applications in the future. Some of these applications will undoubtedly eliminate the costly and complicated wiring commonly used today. These future applications include automotive, domestic, aviation and ship-borne applications, among others. In these future applications each device may include a specialized unit which provides communication for that device in order to send and receive messages transmitted over the communications medium. In this way, a single medium may be used for multiple purposes such as power transmission to devices connected to a power line as well as communications between these devices connected to the power line. One example of such multiple use network communications is that of a home management system as is described in more detail with reference to FIG. 1. Please note that the same basic issues arise in other situations such as in an office building or storage warehouse.

Figure 1:
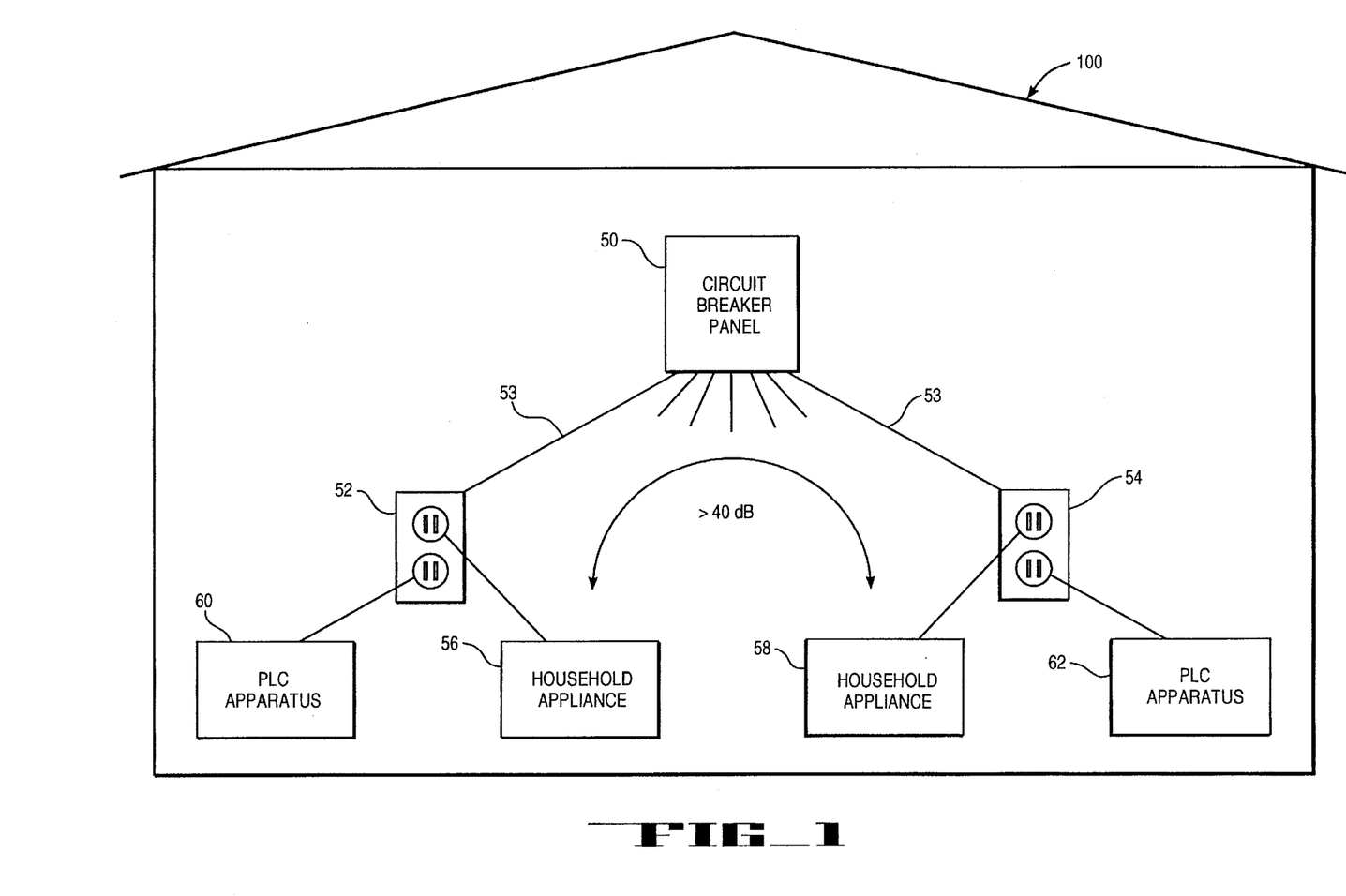
FIG. 1 is a simplified example configuration of the power line communication apparatus as used in the present invention.

As can be seen in FIG. 1, a house 100 is shown having a number of devices each coupled via a single communications medium which, in this case, is the standard electrical power line which exists in most houses. These devices can have intelligence so that if a particular device is appropriately signalled it will perform a predefined operation.

Using standard house wiring as the communication medium has the advantage of avoiding the high costs of installing dedicated communication wiring to new or existing buildings. Additionally, using standard house wiring as the communication medium has the advantage of ease of use in that connection to the network is a simple and familiar process for anyone who has ever plugged in a home appliance.

One difficulty in using house wiring for the communication medium is the large amount of noise which exists on the house wiring due to the large variety of pre-existing appliances connected to the wiring network. A further difficulty is caused by all of the attenuation which exists in the house wiring due to a variety of sources as is discussed more fully below. This attenuation of the communications signal may be 40 decibals (dB) or more. Under these conditions it can be very difficult for a communication device to properly receive such an attenuated signal while an adjacent appliance is producing large amounts of noise.

SUMMARY AND OBJECTS OF THE INVENTION

One objective of the present invention is to provide a coupling circuit with minimal attenuation at its output terminals.

Another objective of the present invention is to provide a coupling circuit with minimal attenuation at its output terminals when connected to a wall outlet of a typical house.

These and other objects of the present invention are provided for by a circuit for coupling a signal source to a signal line having a given impedance. The circuit comprises a resistor having sufficient resistance to limit the current of the signal source if the signal line is shorted to thus prevent the signal source from saturating, a capacitor having sufficient impedance to limit the current in the signal line at a first frequency wherein the signal line may also be carrying current at the first frequency, and an inductive element having sufficient impedance to substantially cancel out the impedance of the capacitor and the impedance of the signal line at a second frequency wherein the signal source outputs the second frequency.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A power line communication (PLC) apparatus is described which enables communications over power lines between devices. In the following description numerous specific details are set forth, such as specific frequencies, component values, etc. These details are provided to enable one to fully appreciate and understand the present invention. It will be obvious to one skilled in the art that the present invention may be practiced without these specific details. In other instances, well-known circuits have been shown in block diagram form in order not to unnecessarily obscure the present invention in detail.

Referring again to FIG. 1, a portion of a typical household configuration using the transmitter/receivers of the present invention can be seen. PLC apparatus 60 is plugged into one receptacle of wall outlet 52 (alternatively, wall outlet 52 may itself incorporate the communications intelligence of PLC apparatus 60). Also shown in FIG. 1, household appliance 56 is also plugged into wall outlet 52. Wall outlet 52 is connected by house wiring 53 to a main circuit breaker panel of the dwelling. Other wall outlets, such as outlet 54, are also connected to circuit breaker panel 50 via house wiring 53 in parallel with wall outlet 52. Another PLC apparatus 62 is shown plugged into one receptacle of wall outlet 54 of FIG. 1. Also shown in FIG. 1, household appliance 58 is also plugged into wall outlet 54.

PLC apparatus 60 can send a command signal through wall outlet 52 across the house wiring 53 to circuit breaker panel 50 then across the house wiring 53 to wall outlet 54 and on to PLC apparatus 62. This command signal may indicate to PLC apparatus 62 to take some action such as turning on a light which is connected to PLC apparatus 62. Of course, because PLC apparatuses can transmit as well as receive communication signals, transmitter/receiver 62 can equally signal PLC apparatus 60 to take some action.

Because of the large amount of noise down at the power transmission frequency level of 60 hertz (the standard frequency level in the U.S.), or 50 hertz (commonly used in foreign countries), when it is desired to transmit data on a power line it is common to modulate a carrier signal and transmit data at some higher frequency. In the preferred embodiment of the present invention this higher frequency is approximately 100–150 kilohertz. Note that higher frequencies encounter higher attenuation while lower frequencies encounter greater noise.

Unfortunately, because power lines (and appliances connected to them) weren't designed to allow operation of a communication network, there are few standards and controls in place to limit the impedance of the appliances which may be connected to the receptacles of the various wall outlets in a house. While some appliances and devices may have very large impedances others may have impedances of only one ohm or less. If an appliance with a low impedance is connected to one receptacle of a wall outlet when a PLC apparatus is connected to the other receptacle of the same wall outlet then there is an attenuation of the signal output from the PLC apparatus which can occur even before the signal is placed on the wiring going to the circuit breaker panel. This attenuation is due to a voltage divider effect between the output impedance of the PLC apparatus and the impedance of the appliance when both are connected to the same wall outlet. This voltage divider effect is discussed more fully below with reference to FIG. 5.

Further, due to the impedance of house wiring 53 between wall outlet 52 and circuit breaker panel 50, there is a series inductance the impedance of which in conjunction with the collective line to neutral impedance at panel 50 further attenuates the signal from PLC apparatus 60 which is connected to wall outlet 52. In a typical house the length of wiring 53 between a wall outlet and a circuit breaker panel is typically 40 feet or more which results in approximately 10 ohms of impedance in the 100–150 kilohertz range. Please note that with the frequencies used in the preferred embodiment of the present invention it is not necessary to view this as a transmission line because the distance between a wall outlet and a circuit breaker in a typical home is less than one quarter of a wave length. Note also the house wiring is terminated (at panel 50) in something less than its characteristic impedance. Therefore, it is the inductance of the house wiring and not the capacitance which is the critical element.

Then, when all of the lines going into circuit breaker panel 50 are connected in parallel, the impedance at circuit breaker panel 50 forms another impedance. This circuit breaker parallel impedance can be as low as one ohm. Thus the impedance of wiring 53 and the impedance of panel 50 function as a voltage divider attenuating signals transmitted by PLC 60. Also, there can be additional attenuation of the signal from one PLC apparatus to another when they reside on the opposing two phases of power in a household. Note: while there is a measure of signal coupling between the two phases it is typically with an attenuation of 15–20 dB.

Still further, due to the impedance of house wiring 53 between circuit breaker panel 50 and outlet 54 there is a series inductance the impedance of which in conjunction with the collective line to neutral impedance at outlet 54 further attenuates the signal from PLC apparatus 60. As stated above, this series impedance is approximately 10 ohms in the 100–150 kilohertz range.

And finally, when a household appliance 58 is coupled in parallel to the same wall outlet 54 as PLC apparatus 62 another voltage divider effect is formed between the impedance of wiring 53, from panel 50 to outlet 54, and the impedance of appliance 58.

In total, the attenuation in a typical household may be greater than 40 dB. To repeat, this is caused by the voltage divider effect of the PLC apparatus when another device is also connected to the same wall outlet, the high series impedance of the house wiring, the low parallel impedance of the circuit breaker panel, the imperfect coupling between the two phases of household power, a second series impedance of house wiring, and the parallel impedance of appliance 58. Further, it is estimated that approximately 20–40% of this attenuation can occur right at the wall outlet due to the voltage divider effect.

Figure 2:
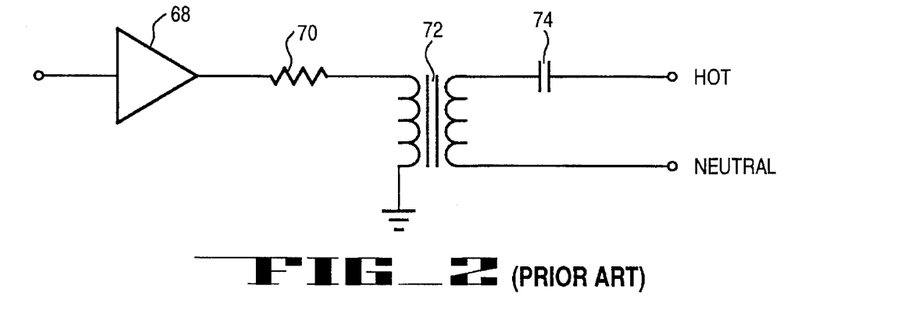
FIG. 2 is a prior art power line coupling network and transmit amplifier.

FIG. 2 depicts a simplified diagram of a transmit amplifier 68 and a prior art power line coupling network containing a series resistor 70, a coupling transformer 72 and a series capacitor 74. Transmit amplifier 68 increases the transmit signal to enough power to get it out onto the power line while the coupling transformer 72 electrically isolates the power line communication apparatus from direct connection with the power line.

Series resistance 70 limits the drive current of transmit amplifier 68 should there be a low impedance across the output terminals. Typical series resistance in the prior art is in the range of 5 to 20 ohms ($\Omega$).

Series capacitor 74 limits the power line current at the power transmission frequency (e.g., 60 Hz). The size of capacitor 74 must be chosen properly in order to accomplish this. If capacitor 74 is too small, it becomes a problem to the transmit circuit because a smaller capacitor would provide a larger impedance to the communications signal frequencies (i.e., 100–150 KHz) which thus causes greater attenuation of the transmit signal. Conversely, if capacitor 74 is too large the impedance drops in which case more low frequency power transmission current will flow and thus coupling transformer 72 is more likely to saturate. Therefore, typical series capacitance in the prior art is in the range of 0.10 to 0.47 microfarads ($\mu F$).

Figure 3:
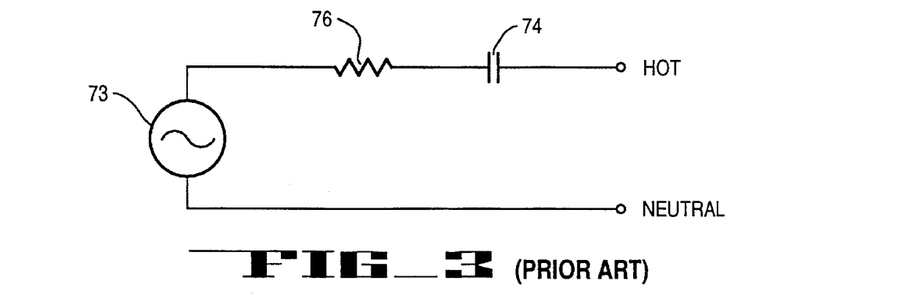
FIG. 3 is a reduced circuit of the prior art power line coupling network and transmit amplifier of FIG. 2.

Referring now to FIG. 3, when one wishes to analyze operation primarily at communication signal frequencies a reduced Thevenin equivalent circuit of the circuit of FIG. 2 can be drawn wherein transmit amplifier 68 and coupling transformer 72 have been replaced with a voltage source 73 in series with a resistor 76 and capacitor 74. This reduction technique is well known in the art.

Figure 4:
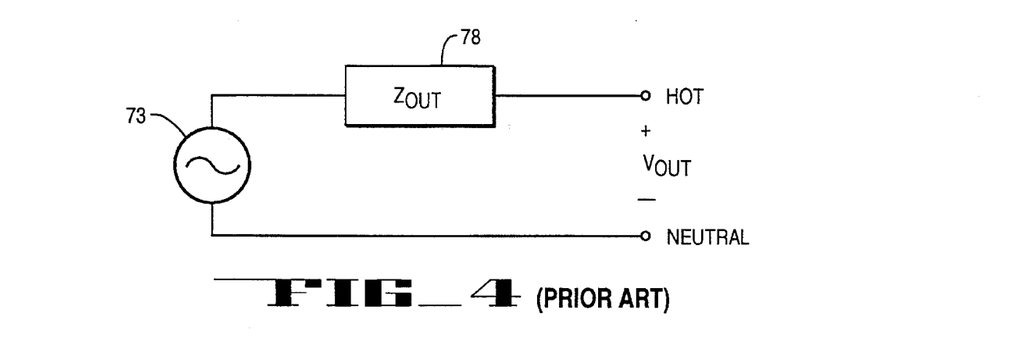
FIG. 4 is a reduced circuit of the prior art power line coupling network and transmit amplifier of FIG. 3.

This circuit can be further reduced, as shown in FIG. 4, when the impedance is of primary interest, thus leaving merely a voltage source 73 and the complex impedance 78 of the power line coupling network itself as the sole elements. This reduction technique is also well known in the art.

Impedance 78 is a function of the impedance of resistor 76 and the impedance of capacitor 74 of FIG. 3. Again, as stated above, this is one prior art approach to implementing a power line coupling network.

However, the prior art power line coupling network of FIG. 3 incurs further difficulties, as was referred to above. If the output terminals of the power line coupling network of FIG. 3 are connected to a wall outlet receptacle when another device is connected to another receptacle of the same wall outlet, a voltage divider effect occurs which can substantially attenuate the output signal from the power line coupling network.

Figure 5:
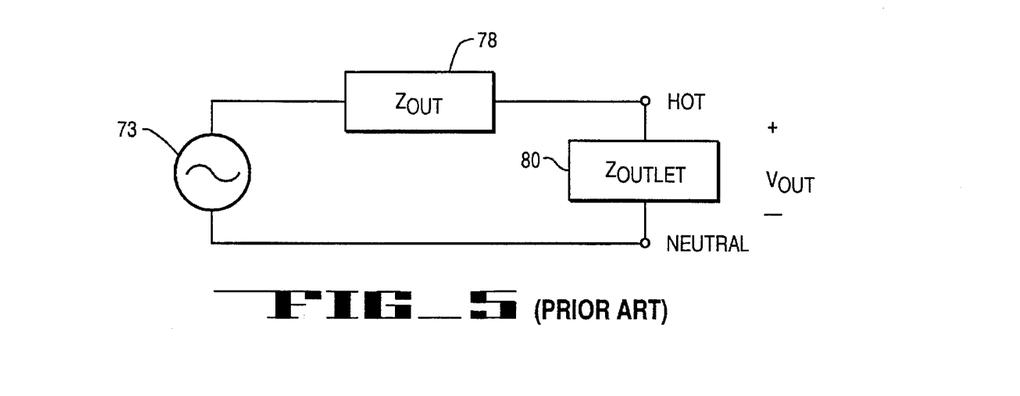
FIG. 5 is a reduced circuit of the prior art power line coupling network and transmit amplifier of FIG. 3 further including a local receptacle impedance voltage divider.

FIG. 5 depicts the voltage divider effect of a prior art power line coupling network connected in parallel with another device plugged into the same wall outlet. The impedance of the power line coupling network is depicted as $Z_{out}$ 78 while the impedance of the device coupled in parallel is depicted as $Z_{outlet}$ 80. In this situation, the voltage which the power line coupling network actually places on the line ($V_{outlet}$) is attenuated and is therefore equal to the open circuit output voltage of the power line coupling network itself ($V_{out}$ 73) multiplied by the impedance $Z_{outlet}$ 80 divided by the sum of the impedances $Z_{outlet}$ 80 and $Z_{out}$ 78 ($V_{outlet} = V_{out} (Z_{outlet}/Z_{outlet} + Z_{out}))$.

Because it is generally impractical to build this type of power line coupling network with less than five ohms of output impedance ($Z_{out}$ 78) and because the impedance of a device connected in parallel to the power line coupling network ($Z_{outlet}$ 80) can be an ohm or less, the signal attenuation through the power line coupling network can be 16 decibals or more:

$$\text{Attenuation} = 10 \log(V_{outlet}^2/V_{out}^2) = 20 \log(V_{outlet}/V_{out}) = 20 \log(Z_{outlet}/(Z_{outlet}+Z_{out})) = 20 \log 1/(1+5) = 16).$$

Figure 6:
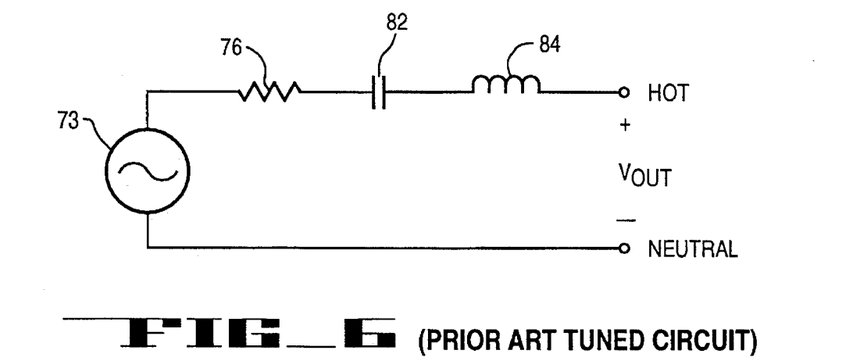
FIG. 6 is a reduced circuit of a series resonant power line coupling network.

Another prior art approach to power line coupling networks is the use of a series resonant coupling network as is shown in FIG. 6. In a series resonant coupling network, as compared to the power line coupling network of FIG. 2, the size of capacitor 82 is reduced (which thus lowers its cost) and a series inductor 84 is added. The inductor value is chosen so that at the carrier frequency the inductor's inductive reactance ($2\pi f_c L$) cancels out the capacitor's capacitive reactance ($-1/2\pi f_c C$). In this way, the impedance $Z_{out}$ 78 at the carrier frequency is merely the resistance 76 of the power line coupling network. Of course, in this idealized environment the power line coupling network is only connected to resistive loads.

Unfortunately, when this series resonant coupling network is connected to power lines which consist of other than pure resistive loads this offset of a positive reactance with a negative reactance at a given frequency can be lost. And in reality there is rarely just a resistive load in power lines and hence the reactance of these real world power lines can, in effect, "detune" the resonant circuit. Thus, although no reactance may be seen in an idealized environment, once reactances of a real world power line are connected to the resonant circuit of the power line coupling network these other reactances can still cause attenuation of the output signal.

For example, if a 0.047 microfarad coupling capacitor 82 is placed in series with a 39 microhenry inductor 84 then, in an idealized world, the −29 ohms reactive impedance of capacitor 82 (at 118 kHz) would be offset by the +29 ohms reactive impedance of inductor 84 (at 118 kHz). However, once the series resonant power line coupling network is connected to a wall outlet which is connected to a 40 foot length of house wiring then (because house wiring has an inductance of approximately 0.25 microhenries per foot) an additional 12.5 microhenries is added in series to the circuit which is enough to detune the resonant circuit.

Further, if a still smaller capacitor 82 were used in an attempt to offset the additional inductance of the house wiring, then very high attenuation would occur if the transmit receptacle capacitance were primarily capacitive in nature (in which case the resonance would occur above the carrier frequency and the attenuation would be caused by a capacitive divider).

Because it is important in the present invention to provide suitable power signals with minimal power loss/attenuation for a large percentage of households, it is desirable that a minimal percentage of households have an overall attenuation of ≧55 decibals (dB). The following table shows the results of tests and simulations in the communication signal frequency range of 100–150 kHz of the prior art conventional power line coupling network, the prior art series resonant power line coupling network, and various values of inductors 84 of the series resonant power line coupling network of the present invention each showing an improvement over the prior art series resonant power line coupling network.

| Power Line Coupling Network | Source Impedance | % of households with ≧55 dB attenuation |
|---|---|---|
| conventional | 5Ω + .27 μF | .88% |
| reduced cap only | 5Ω + .047 μF | 6.05% |
| std. series resonant | 5Ω + .047 μF + 39 μH | 2.94% |
| improved ser. res. | 5Ω + .047 μF + 33 μH | 1.40% |
| improved ser. res. | 5Ω + .047 μF + 27 μH | .79% |
| improved ser. res. | 5Ω + .047 μF + 22 μH | .70% |
| improved ser. res. | 5Ω + .047 μF + 18 μH | .93% |

The above table shows that the series resonant L/C coupling circuit of the present invention achieves better performance than either the prior art conventional power line coupling network or the prior art series resonant circuit and is accomplished by adjusting the resonant elements to account for the realities of the typical power line which is being connected to. The above table further shows that there is an optimal amount of inductive reactance to offset the capacitive reactance of both the coupling network and a typical house and therefore merely using the smallest value of series inductor does not provide the best results. Therefore, in the preferred embodiment of the series resonant power line coupling network of the present invention a 0.047 microfarad capacitor is placed in series with a 22 microhenry inductor to best offset the reactances when connecting to a real world power line having more than just resistive elements.

It is important to note that the only component variation between the prior art series resonant power line coupling network and the preferred embodiment of the power line coupling network of the present invention is changing the 39 microhenry inductor to a 22 microhenry inductor. It is believed that this difference of approximately 17 microhenries is the proper value to compensate for the de-tuning effect of the typical power line being coupled to. Therefore, while in the preferred embodiment a 22 microhenry inductor is used, this particular value is optimized for a 100–150 kHz communication signal frequency with a 0.047 microfarad capacitor. However, if the communication signal frequency and the capacitor are chosen to be different values than in the preferred embodiment of the present invention, then the inductor value would also have to be adjusted so as to maintain the above-explained approximately 17 microhenry difference.

Figure 7:
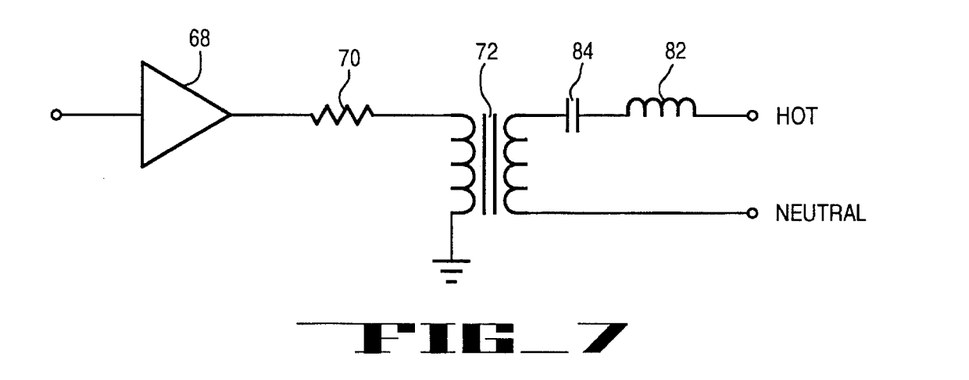
FIG. 7 is a transmit amplifier and power line coupling network of the present inventions.

Referring now to FIG. 7, transmit amplifier 68 is shown coupled to the preferred embodiment of the power line coupling network of the present invention. More specifically, transmit amplifier 68 is coupled through series resistance 70 (approximately 5–20 ohms, as explained above) to coupling transformer 72. Coupling transformer 72 is coupled through series inductor 82 of approximately 22 microhenries and series capacitor 84 of approximately 0.047 microfarads to the hot lead of a wall receptacle.

Figure 8:
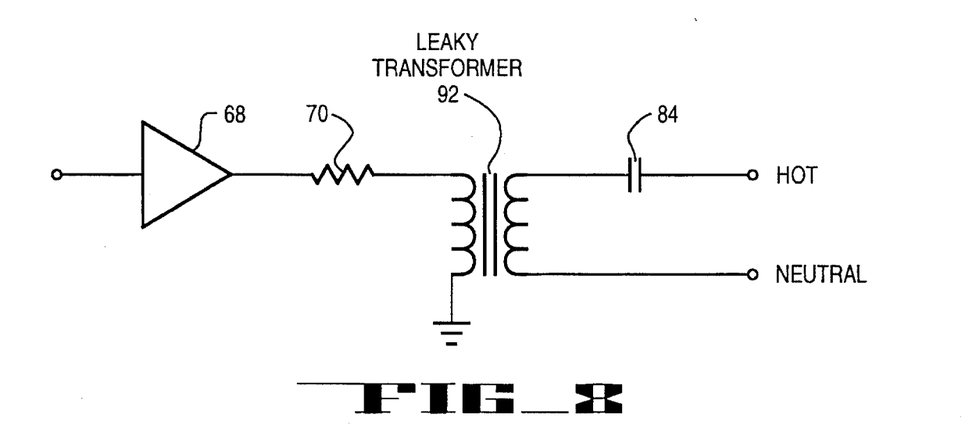
FIG. 8 illustrates another embodiment of the transmit amplifier and power line coupling network of the present invention that includes the use of a leakage transformer.

In an alternative embodiment, the separate inductor element could be replaced by L utilizing a transformer having the appropriate leakage inductance, such as leakage transformer 92 shown in FIG. 8. More specifically, by using a transformer wherein the flux from the winding on one side does not fully couple to the winding on the other side, in this way the desired series inductance can be created in the transformer itself. Stated differently, by using a transformer with a leakage inductance of 22 microhenries no discrete inductive component is needed which thus simplifies, and lowers the cost of, the power line coupling circuit.

An additional benefit of the present invention is the avoidance of coupling transformer saturation from low frequency power line noise. The problem with the coupling transformer saturating with low frequency noise is that the shape of the noise impulses is modified (by the transformer's saturation) to have a faster falling edge than rising edge. Then the adaptive snubber incorrectly snubs on the tail edge of some of the noise when it should not be snubbed at all. The series resonant circuitry of the power line coupling network of the present invention prevents this from occuring because the power line coupling network of the present invention does not allow as much low frequency current to flow in the coupling transformer and thus the transformer does not saturate from low frequency noise and thus the impulse waveform is not distorted and thus the snubber can operate properly.

In the foregoing specification, the invention has been described with reference to the presently preferred embodiment thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

What is claimed is:

1. A circuit for coupling a signal source to a power line having a given impedance due to at least one non-purely resistive load coupled to the power line, such that the power line has a predetermined inductance, and wherein the power line includes two conductors for communicating a signal from the signal source, the circuit comprising:

a resistor having first and second terminals, wherein said first terminal of said resistor is coupled to said signal source, said resistor having sufficient resistance to limit the current of the signal source if the power line is shorted to thus prevent the signal source from saturating;

a coupling transformer having first and second primary terminals and first and second secondary terminals, wherein the first primary terminal is coupled to the second terminal of said resistor and the second primary terminal is coupled to ground potential, and wherein the second secondary terminal is coupled to one of the two conductors of the power line, wherein said coupling transformer transfers the signal between the signal source and the power line, such that the coupling transformer isolates the signal source from the power line when communicating said signal;

a capacitor having first and second terminals, wherein said first terminal of said capacitor is coupled to said the first secondary terminal of said coupling transformer, said capacitor having sufficient impedance to limit the current in the power line at a first frequency when the power line carries current at the first frequency, wherein the capacitor has a predetermined reactance;

an inductive element having first and second terminals, wherein said first terminal of said inductive element is coupled to said second terminal of said capacitor and said second terminal of said inductive element is coupled to the other of the two conductors of said power line, such that said inductive element and said capacitor are coupled in series to form a series resonant circuit, said inductive element having sufficient impedance to compensate for the de-tuning due to said at least one non-purely resistive load coupled to the power line, so that the inductance of the inductive element and the predetermined inductance of the power line at a second frequency offset the predetermined reactance of the capacitor, such that said circuit is tuned, wherein the signal source outputs the second frequency, wherein the impedance of the inductive element is at a predetermined number of microhenries less than an inductance necessary to offset the predetermined reactance of the capacitor to compensate for impedances attributed to devices coupled to the power line and building wiring and voltage divider effects of the power line.

2. The coupling circuit of claim 1 wherein the impedance of the inductive element is at a value of 17 microhenries less than the inductance necessary to offset the reactance of the capacitor if the power line had no inductance.

3. The coupling circuit of claim 1 wherein the resistance of the resistor is in the range of 5 to 20 ohms.

4. The coupling circuit of claim 3 wherein the capacitor has a value of 0.047 microfarads.

5. The coupling circuit of claim 4 wherein the inductive element is comprised of an inductor which has a value between 18 and 27 microhenries.

6. The coupling circuit of claim 5 wherein the first frequency is rated at 60 hertz.

7. The coupling circuit of claim 6 wherein the second frequency is in the range of 100 to 150 kilohertz.

8. The coupling circuit of claim 4 wherein the coupling transformer and the inductive element together comprise a leaky transformer which has an inductance value of 22 microhenries.

9. A circuit for coupling a signal source to a power line having a given impedance due to at least one non-purely resistive load coupled to the power line, such that the power line has a predetermined inductance, and wherein the power line includes two conductors for communicating a signal from the signal source, the circuit comprising:

a resistor having first and second terminals, wherein said first terminal of said resistor is coupled to said signal source, said resistor having sufficient resistance to limit the current of the signal source if the power line is shorted to thus prevent the signal source from saturating;

a coupling transformer having first and second primary terminals and first and second secondary terminals, wherein the first primary terminal is coupled to the second terminal of said resistor and the second primary terminal is coupled to ground potential, and wherein the second secondary terminal is coupled to one of the two conductors of the power line, wherein said coupling transformer transfers the signal between the signal source and the power line, such that the coupling transformer isolates the signal source from the power line when communicating said signal;

a capacitor having first and second terminals, wherein said first terminal of said capacitor is coupled to said the first secondary terminal of said coupling transformer, said capacitor having sufficient impedance to limit the current in the power line at a first frequency when the power line carries current at the first frequency, wherein the impedance of the capacitor is a predetermined reactance;

an inductive element having first and second terminals, wherein said first terminal of said inductive element is coupled to said second terminal of said capacitor and said second terminal of said inductive element is coupled to the other of the two conductors of said power line, such that said inductive element and said capacitor are coupled in series to form a series resonant circuit, said inductive element having sufficient impedance to compensate for the de-tuning due to said at least one non-purely resistive load coupled to the power line, so that the inductance of the inductive element does not cancel out the impedance of the capacitor if the power line had no inductance at a second frequency and yet the inductance of the inductive element and the predetermined inductance of the power line at the second frequency still offsets the predetermined reactance of the capacitor, such that said circuit is tuned, wherein the signal source outputs the second frequency, wherein the impedance of the inductive element is at a predetermined number of microhenries less than an inductance necessary to offset the predetermined reactance of the capacitor to compensate for impedances attributed to devices coupled to the power line and building wiring and voltage divider effects of the power line.

10. The coupling circuit of claim 9 wherein the impedance of the inductive element is 17 microhenries less than the inductance necessary to offset the reactance of the capacitor if the power line had no inductance.

11. The coupling circuit of claim 9 wherein the first frequency is rated at 60 hertz.

12. The coupling circuit of claim 11 wherein the second frequency is in the range of 100 to 150 kilohertz.

13. The coupling circuit of claim 12 wherein the capacitor has a value of 0.047 microfarads.

14. The coupling circuit of claim 13 wherein the inductive element is comprised of an inductor which has a value of 22 microhenries.

15. The coupling circuit of claim 14 wherein the resistance of the resistor is in the range of 5 to 20 ohms.

16. A circuit for coupling a signal source to a power line having a given impedance due to at least one non-purely resistive load coupled to the power line, such that the power line has a predetermined inductance, and wherein the power line includes two conductors for communicating a signal from the signal source, the circuit comprising:

a resistor having first and second terminals, wherein said first terminal of said resistor is coupled to said signal source, said resistor having sufficient resistance to limit the current of the signal source if the power line is shorted to thus prevent the signal source from saturating;

a transformer having first coil having first and second primary terminals and a second coil having first and second secondary terminals, wherein said first primary terminal is coupled to said second terminal of said resistor and the second primary terminal is coupled to ground, and wherein the second secondary terminal is coupled to one of the two conductors of the power line, said transformer isolating the signal source from the power line during coupling;

a capacitor having first and second terminals, wherein said first terminal of said capacitor is coupled to the first secondary terminal of said second coil of said transformer, said capacitor having sufficient impedance to limit the current in the power line at a first frequency when the power line carries current at the first frequency, wherein the impedance of the capacitor is a predetermined reactance; and an inductive element having first and second terminals, wherein said first terminal of said inductive element is coupled to said second terminal of said capacitor and said second terminal of said inductive element is coupled to the other of the two conductors of said power line, such that said inductive element, said capacitor and said resistor operate as a series resonant circuit coupled in series, said inductive element having sufficient impedance to compensate for the de-tuning due to said at least one non-purely resistive load coupled to the power line, so that the inductance of the inductive element and the predetermined inductance of the power line at a second frequency offset the predetermined reactance of the capacitor, such that said circuit is tuned and prevents said transformer from becoming saturated, wherein the signal source outputs the second frequency, wherein the impedance of the inductive element is at a predetermined number of microhenries less than an inductance necessary to offset the predetermined reactance of the capacitor to compensate for impedances attributed to devices coupled to the power line and building wiring and voltage divider effects of the power line.

17. The coupling circuit of claim 16 wherein the impedance of the inductive element is 17 microhenries less than the inductance necessary to offset the reactance of the capacitor if the power line had no inductance.

18. A circuit for coupling a signal source to a power line having a given impedance due to at least one non-purely resistive load coupled to the power line, such that the power line has a predetermined inductance, and wherein the power line includes two conductors for communicating a signal from the signal source, the circuit comprising:

a resistor having first and second terminals, wherein said first terminal of aid resistor is coupled to said signal source, said resistor having sufficient resistance to limit the current of the signal source if the power line is shorted to thus prevent the signal source from saturating;

a coupling transformer having a first coil having first and second primary terminals and a second coil having first and second secondary terminals, wherein said first primary terminal is coupled to said second terminal of said resistor and the second primary terminal is coupled to ground, and wherein the second secondary terminal is coupled to one of the two conductors of the power line, said transformer isolating the signal source from the power line during coupling; and a capacitor having first and second terminals, wherein said first terminal of said capacitor is coupled to said the first secondary terminal of said coupling transformer and the second terminal of the capacitor is coupled to the other of said two conductors of the power line, said capacitor having sufficient impedance to limit the current in the power line at a first frequency when the power line carries current at the first frequency, wherein the impedance of the capacitor is a predetermined reactance, wherein said coupling transformer has a leakage inductance, said leakage inductance being sufficient to compensate for the de-tuning due to said at least one non-purely resistive load coupled to the power line, so that the leakage inductance of the coupling transformer and the predetermined inductance of the power line at a second frequency offset the predetermined reactance of the capacitor, such that said circuit is tuned, wherein the signal source outputs the second frequency, and further wherein the leakage inductance of the coupling transformer is at a predetermined number of microhenries less than an inductance necessary to offset only the predetermined reactance of the capacitor to compensate for impedances attributed to devices coupled to the power line and building wiring and voltage divider effects of the power line.

19. A circuit for coupling a communication signal to a power line, wherein said power line operates at a power distribution frequency, said circuit comprising:

a transformer;

a capacitor coupled in a series between the transformer and the power line, wherein the capacitor has sufficient impedance to limit current drawn from the power line at the power distribution frequency, and further wherein the capacitor has a capacitive reactance; and an inductive element coupled in series with the capacitor, wherein the inductive element has an inductance less than the inductance that fully cancels the capacitive reactance of the capacitor at frequencies used for communication; and wherein the inductance of the inductive element compensates for impedances attributed to devices coupled to the power line and building wiring and voltage divider effects of the power line.

20. The circuit defined in claim 19 wherein the communication signal is generated by a communication signal source, and wherein the circuit further comprises a resistive element coupled between the communication signal source and the transformer, wherein the resistive element limits current from the communication signal source when impedance of the power line becomes a short circuit at said frequencies used for communication.

21. The circuit defined in claim 19 wherein the power distribution frequency comprises 50 Hz.

22. The circuit defined in claim 19 wherein the power distribution frequency comprises 60 Hz.

23. The circuit defined in claim 19 wherein frequencies used for communication signal source ranges from 100 KHz to 150 KHz.

24. A circuit for coupling a communication signal to a power line, wherein the power line operates at a power distribution frequency, said circuit comprising:

a transformer;

a capacitor coupled between the transformer and the power line having sufficient impedance to limit current drawn from the power line at the power distribution frequency, wherein the capacitor has a capacitive reactance;

an inductive element directly connected in series to the capacitor, such that the transformer, the power line, the capacitor and the inductive element are coupled in series, wherein the inductive element has an inductance less than the inductance that fully cancels the capacitive reactance of the capacitor at frequencies used for communication, and wherein the inductance of the inductive element compensates for impedances attributed to devices coupled to the power line and building wiring and voltage divider effects of the power line.

25. The circuit defined in claim 24 wherein the communication signal is generated by a communication signal source, and wherein the circuit further comprises a resistive element between the communication signal and the transformer, wherein the resistive element limits current from the communication signal source when impedance of the power line becomes a short circuit at said frequencies used for communication.

26. The circuit defined in claim 24 wherein the power distribution frequency comprises 50 Hz.

27. The circuit defined in claim 24 wherein the power distribution frequency comprises 60 Hz.

28. The circuit defined in claim 24 wherein frequencies used for communication ranges from 100 KHz to 150 KHz.

29. A circuit for coupling a communication signal to a power line, wherein the power line operates at a power distribution frequency, said circuit comprising:

a transformer having a leakage inductance;

a capacitor coupled in series between the transformer and the power line, wherein the capacitor has sufficient impedance to limit current drawn from the power line at the power distribution frequency, and wherein the capacitor has capacitive reactance, and further wherein the leakage inductance is less than the inductance that fully cancels the capacitive reactance of the capacitor at frequencies used for communication and compensates for impedances attributed to devices coupled to the power line and building wiring and voltage divider effects of the power line.

30. The circuit defined in claim 29 wherein the power line includes non-purely resistive impedances and the leakage inductance of the transformer reduces voltage divider effects attributed to non-purely resistive impedances of the power line.

31. The circuit defined in claim 29 wherein the communication signal is generated by a communication signal source, and wherein the circuit further comprises a resistive element between the communication source signal and the transformer, wherein the resistive element limits current from the communication signal source when impedance of the power line becomes a short circuit at said frequencies used for communication.

* * * * *

UNITED STATES PATENT AND TRADEMARK OFFICE
CERTIFICATE OF CORRECTION

| | | |
|---|---|---|
| PATENT NO. | : | 5,485,040 |
| DATED | : | January 16, 1996 |
| INVENTOR(S) | : | Philip H. Sutterlin |

It is certified that error appears in the above-identified patent and that said Letters Patent is hereby corrected as shown below:

In column 10 at line 61 delete "aid" and insert --said--

Signed and Sealed this

Ninth Day of December, 1997

*Attest:*

BRUCE LEHMAN

*Attesting Officer*  *Commissioner of Patents and Trademarks*